US009286396B2

United States Patent
Gao et al.

(10) Patent No.: US 9,286,396 B2
(45) Date of Patent: Mar. 15, 2016

(54) QUERY EXPANSION AND QUERY-DOCUMENT MATCHING USING PATH-CONSTRAINED RANDOM WALKS

(71) Applicant: Microsoft Corporation, Redmond, WA (US)

(72) Inventors: Jianfeng Gao, Woodinville, WA (US); Gu Xu, Redmond, WA (US); Jinxi Xu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 13/951,574

(22) Filed: Jul. 26, 2013

(65) Prior Publication Data

US 2015/0032767 A1 Jan. 29, 2015

(51) Int. Cl.
*G06F 17/30* (2006.01)
(52) U.S. Cl.
CPC .... *G06F 17/30864* (2013.01); *G06F 17/30672* (2013.01); *G06F 17/30867* (2013.01)
(58) Field of Classification Search
CPC ............... G06F 17/30672; G06F 17/30864; G06F 17/30448; G06F 17/3064; G06F 17/30967
USPC ............. 707/765, 706, 759, 767, 797; 706/12
See application file for complete search history.

(56) References Cited

U.S. PATENT DOCUMENTS

| 7,565,627 B2 | 7/2009 | Brill et al. |
| 8,290,975 B2 * | 10/2012 | Gao et al. ...................... 707/767 |
| 8,380,723 B2 | 2/2013 | Radlinski et al. |

| 2007/0083369 A1 * | 4/2007 | McCuller ............... G10L 15/187 704/254 |
| 2008/0140699 A1 | 6/2008 | Jones et al. |
| 2011/0119269 A1 | 5/2011 | Agrawal et al. |
| 2011/0131157 A1 * | 6/2011 | Iyer et al. ......................... 706/12 |

(Continued)

FOREIGN PATENT DOCUMENTS

WO 2007024594 A2 3/2007

OTHER PUBLICATIONS

Song, et al., "Query Suggestion by Constructing Term-Transition Graphs", Retrieved at <<http://research.microsoft.com/pubs/157631/wsdm111-song.pdf>>, In Proceedings of the Fifth International Conference on Web Search and Web Data Mining, Feb. 8, 2012, 10 pages.

(Continued)

*Primary Examiner* — Dennis Truong
(74) *Attorney, Agent, or Firm* — Alin Corie; Sandy Swain; Micky Minhas

(57) ABSTRACT

Various technologies described herein pertain to use of path-constrained random walks for query expansion and/or query document matching. Clickthrough data from search logs is represented as a labeled and directed graph. Path-constrained random walks are executed over the graph based upon an input query. The graph includes a first set of nodes that represent queries included in the clickthrough data from search logs, a second set of nodes that represent documents included in the clickthrough data from the search logs, a third set of nodes that represent words from the queries and the documents, and edges between nodes that represent relationships between queries, documents, and words. The path-constrained random walks include traversals over edges of the graph between nodes. Further, a score for a relationship between a target node and a source node representative of the input query is computed based at least in part upon the path-constrained random walks.

20 Claims, 9 Drawing Sheets

(56) References Cited

U.S. PATENT DOCUMENTS

| | | | | |
|---|---|---|---|---|
| 2011/0289063 | A1* | 11/2011 | Radlinski et al. | 707/706 |
| 2012/0096042 | A1* | 4/2012 | Brockett et al. | 707/798 |
| 2012/0131031 | A1* | 5/2012 | Xie et al. | 707/765 |
| 2015/0032767 | A1* | 1/2015 | Gao et al. | 707/765 |

OTHER PUBLICATIONS

Carpineto, et al., "A Survey of Automatic Query Expansion in Information Retrieval", Retrieved at <<http://www.iro.umontreal.ca/~nie/IFT6255/carpineto-Survey-QE.pdf>>, In Proceedings of ACM Computing Surveys, vol. 44, No. 1, Jan. 2012, 50 pages.

Agichtein, et al., "Improving Web Search Ranking by Incorporating User Behavior Information", Retrieved at <<http://web.cs.dal.ca/~anwar/ir/review/grads.pdf>>, In Proceedings of the 29th Annual International ACM SIGIR Conference on Research and Development in Information Retrieval, Aug. 6, 2006, 8 pages.

Andrew, et al., "Scalable Training of L1-Regularized Log-Linear Models", Retrieved at http://www.machinelearning.org/proceedings/icml2007/papers/449.pdf>>, In Proceedings of the 24th International Conference on Machine Learning, Jun. 20, 2007, 8 pages.

Baeza-Yates, et al., "Extracting Semantic Relations from Query Logs", Retrieved at http://www.ics.uci.edu/~smyth/courses/cs277/papers/query_term_relations_KDD2007_p76-baeza-yates.pdf>>, In Proceedings of the 13th ACM SIGKDD International Conference on Knowledge Discovery and Data Mining, Aug. 12, 2007, 10 pages.

Berger, et al., "Information Retrieval as Statistical Translation", Retrieved at <<http://www.informedia.cs.cmu.edu/documents/irast-final.pdf>>, In Proceedings of the 22nd Annual International ACM SIGIR Conference on Research and Development in Information Retrieval, 1999, 18 pages.

Boldi, et al., "Query Suggestions Using Query-Flow Graphs", Retrieved at <<http://research.yahoo.com/files/p56-boldi.pdf>>, In Proceedings of the 2009 Workshop on Web Search Click Data, Feb. 9, 2009, 8 pages.

Broder, et al., "Online Expansion of Rare Queries for Sponsored Search", Retrieved at <<http://wwwconference.org/www2009/proceedings/pdf/p511.pdf>>, In Proceedings of the 18th International World Wide Web Conference, Apr. 20, 2009, 10 pages.

Brown, et al., "The Mathematics of Statistical Machine Translation: Parameter Estimation", Retrieved at <<http://acl.ldc.upenn.edu/J/J93/J93-2003.pdf>>, In Journal of Computational Linguistics—Special Issue on Using Large Corpora: II, vol. 19, Issue 2, Jun. 1993, 50 pages.

Cao, et al., "Extending Query Translation to Cross-Language Query Expansion with Markov Chain Models", Retrieved at <<http://research.microsoft.com/en-us/um/people/jfgao/paper/cikm2007.mcmodel.camera_ready.pdf>>, In Proceedings of the Sixteenth ACM Conference on Information and Knowledge Management, Nov. 6, 2007, 10 pages.

Cao, et al., "Selecting Good Expansion Terms for Pseudo-Relevance Feedback", Retrieved at <<http://research.microsoft.com/en-us/um/people/jfgao/paper/cao-nie-gao-robertson.sigir08.pdf>>, In Proceedings of the 31st Annual International ACM SIGIR Conference on Research and Development in Information Retrieval, Jul. 20, 2008, 9 pages.

Collins-Thompson, et al., "Query Expansion Using Random Walk Models", Retrieved at <<http://www.cs.cmu.edu/~kct/pubs/cikm2005-cf657-collinsthompson.pdf>>, In Proceedings of the 14th ACM International Conference on Information and Knowledge Management, Oct. 31, 2005, 8 pages.

Craswell, et al., "Random Walks on the Click Graph", Retrieved at <<http://research.microsoft.com/en-us/um/people/nickcr/pubs/craswell_sigir07.pdf>>, In Proceedings of the 30th Annual International ACM SIGIR Conference on Research and Development in Information Retrieval, Jul. 23, 2007, 8 pages.

Crasswell, et al., "An Experimental Comparison of Click Position-Bias Models", Retrieved at <<http://scholar.google.co.in/scholar?hl=en&q=An+Experimental+Comparison+of+Click+Position-Bias+Models+&btnG=>>, In Proceedings of the International Conference on Web Search and Data Mining, Feb. 11, 2008, 8 pages.

Cui, et al., "Probabilistic Query Expansion Using Query Logs", Retrieved at <<http://research.microsoft.com/en-us/um/people/jrwen/jrwen_files/publications/QE-WWW2002.pdf>>, In Proceedings of the 11th International Conference on World Wide Web, May 7, 2002, 8 pages.

Cui, et al., "Query Expansion by Mining User Logs", Retrieved at <<http://research.microsoft.com/en-us/um/people/jrwen/jrwen_files/publications/QE-TKDE.pdf>>, In Journal of IEEE Transaction on Knowledge and Data Engineering, vol. 15, Issue 4, Jul. 2003, 11 pages.

Dempster, et al., "Maximum Likelihood from Incomplete Data via the EM Algorithm", Retrieved at <<http://web.mit.edu/6.435/www/Dempster77.pdf>>, In Journal of the Royal Statistical Society, vol. 39, Issue 1, Jan. 1977, 38 pages.

Gao, et al., "Clickthrough-Based Translation Models for Web Search: from Word Models to Phrase Models", Retrieved at <<http://research.microsoft.com/en-us/um/people/jfgao/paper/cikm1108-gao.pdf>>, In Proceedings of the 19th ACM International Conference on Information and Knowledge Management, Oct. 26, 2010, 10 pages.

Gao, et al., "A Large Scale Ranker-Based System for Query Spelling Correction", Retrieved at <<http://citeseerx.ist.psu.edu/viewdoc/summary?doi=10.1.1.167.9430>>, In Proceedings of the 23rd International Conference on Computational Linguistics, Aug. 23, 2010, 9 pages.

Gao, et al., "Towards Concept-Based Translation Models using Search Logs for Query Expansion", Retrieved at <<http://research.microsoft.com/en-us/um/people/jfgao/paper/2012-papers/fp104-gao.pdf>>, In 21st ACM International Conference on Information and Knowledge Management, Oct. 29, 2012, 10 pages.

Gao, et al., "Smoothing Clickthrough Data for Web Search Ranking", Retrieved at <<http://research.microsoft.com/en-us/um/people/jfgao/paper/click.gao-et.al.camera.v2.pdf>>, In Proceedings of the 32nd International ACM SIGIR Conference on Research and Development in Information Retrieval, Jul. 19, 2009, 9 pages.

Haveliwala, Taher H., "Topic-Sensitive PageRank", Retrieved at <<http://delivery.acm.org/10.1145/520000/511513/p517-haveliwala.pdf?ip=203.8.109.15&acc=ACTIVE%20SERVICE&key=C2716FEBFA981EF1193B1DAAE4F8BDAFA31CC7C692744019&CFID=220032628&CFTOKEN=31915988&_acm_=13 69638676_d1727c61fda63415fd80c467e4cfe594>>, In Proceedings of the 11th International Conference on World Wide Web, May 7, 2002, 10 pages.

Huang, et al., "Exploring Web Scale Language Models for Search Query Processing", Retrieved at <<http://research.microsoft.com/pubs/121455/wfp0419-huang-final.pdf>>, In Proceedings of the 19th International Conference on World Wide Web, Apr. 26, 2010, 10 pages.

Jarvelin, et al., "IR Evaluation Methods for Retrieving Highly Relevant Documents", Retrieved at <<http://citeseerx.ist.psu.edu/viewdoc/download?doi=10.1.1.20.2887&rep=rep1&type=pdf>>, In Proceedings of the 23rd Annual International ACM SIGIR Conference on Research and Development in Information Retrieval, Jul. 24, 2000, 9 pages.

Joachims, Thorsten, "Optimizing Search Engines Using Clickthrough Data", Retrieved at <<http://pdf.aminer.org/000/472/865/optimizing_search_engines_using_clickthrough_data.pdf>>, In Proceedings of the Eighth ACM SIGKDD International Conference on Knowledge Discovery and Data Mining, Jul. 23, 2002, 10 pages.

Jing, et al., "An Association Thesaurus for Information Retrieval", Retrieved at <<http://citeseerx.ist.psu.edu/viewdoc/download?doi=10.1.1.48.2421&rep=rep1&type=pdf>>, In Technical Report of an Association Thesaurus for Information Retrieval, Oct. 11, 1994, 15 pages.

Koehn, et al., "Statistical Phrase-Based Translation", Retrieved at <<http://www.isi.edu/~marcu/papers/phrases-hlt2003.pdf>>, In Proceedings of the Conference of the North American Chapter of the Association for Computational Linguistics on Human Language Technology, vol. 1, Jul. 22, 2002, 7 pages.

Lafferty, et al., "Document Language Models, Query Models, and Risk Minimization for Information Retrieval", Retrieved at <<http://ciir.cs.umass.edu/irchallenges/risk.pdf>>, In the 24th Annual Inter-

(56) References Cited

OTHER PUBLICATIONS national ACM SIGIR Conference on Research and Development in Information Retrieval, Sep. 9, 2001, 9 pages.

Lao, et al., "Relational Retrieval Using a Combination of Path-Constrained Random Walks", Retrieved at <<http://www.cs.cmu.edu/~wcohen/postscript/ecml-2010-ni.pdf>>, In Journal of Machine Learning, vol. 81 Issue 1, Oct. 2010, 16 pages.

Lao, et al., "Reading the Web with Learned Syntactic-Semantic Inference Rules", Retrieved at <<http://www.cs.cmu.edu/~nlao/doc/2012/emnlp.pdf>>, In Proceedings of the Joint Conference on Empirical Methods in Natural Language Processing and Computational Natural Language Learning, Jul. 12, 2012, 10 pages.

Lavrenko, et al., "Relevance-Based Language Models", Retrieved at <<http://citeseerx.ist.psu.edu/viewdoc/download?doi=10.1.1.21.2668&rep=rep1&type=pdf>>, In Proceedings of the 24th Annual International ACM SIGIR Conference on Research and Development in Information Retrieval, Sep. 9, 2001, 8 pages.

Mei, et al., "Query Suggestion Using Hitting Time", Retrieved at <<http://citeseerx.ist.psu.edu/viewdoc/download?doi=10.1.1.150.1524&rep=rep1&type=pdf>>, In Proceedings of the 17th ACM Conference on Information and Knowledge Management, Oct. 26, 2008, 9 pages.

Metzler, et al., "Latent Concept Expansion Using Markov Random Fields", Retrieved at <<http://maroo.cs.umass.edu/pdf/IR-504.pdf>>, In Proceedings of the 30th Annual International ACM SIGIR Conference on Research and Development in Information Retrieval, Jul. 23, 2007, 8 pages.

Minkov, et al., "Contextual Search and Name Disambiguation in Email Using Graphs", Retrieved at <<http://www.cs.cmu.edu/~wcohen/postscript/sigir2006.pdf>>, In Proceedings of the 29th Annual International ACM SIGIR Conference on Research and Development in Information Retrieval, Aug. 6, 2006, 8 pages.

Prager, et al., "Use of WordNet Hypernyms for Answering What-is Questions", Retrieved at <<http://www.egr.msu.edu/~jchai/QAPapers/prager01useofwordnet.pdf>>, In Proceedings of the Tenth Text Retrieval Conference, Nov. 13, 2001, 8 pages.

Robertson, et al., "The Probabilistic Relevance Framework: BM25 and Beyond", Retrieved at <<http://www.soi.city.ac.uk/~ser/papers/foundations_bm25_review.pdf >>, In Journal of Foundations and Trends in Information Retrieval, vol. 3, Issue 4, Apr. 2009, 59 pages.

Riezler, et al., "Translating Queries into Snippets for Improved Query Expansion", Retrieved at <<http://tangra.si.umich.edu/~radev/767w10/papers/Week06/TextRepresentation/Riezler.pdf>>, In Proceedings of the 22nd International Conference on Computational Linguistics, vol. 1, Aug. 18, 2008, 8 pages.

Riezler, et al., "Query Rewriting Using Monolingual Statistical Machine Translation", Retrieved at <<http://www.stefanriezler.com/PAPERS/CL2010.pdf>>, In Journal of Computational Linguistics, vol. 36, Issue 3, Sep. 2010, 14 pages.

Toutanova, et al., "Learning Random Walk Models for Inducing Word Dependency Distributions", Retrieved at <<http://delivery.acm.org/10.1145/1020000/1015442/p391-toutanova.pdf>>, In Proceedings of the 21st International Conference on Machine Learning, Jul. 4, 2004, 8 pages.

Wen, et al., "Query Clustering Using User Logs", Retrieved at <<http://rali.iro.umontreal.ca/rali/sites/default/files/publis/ACMTOIS2002.pdf>>, In Proceedings of ACM Transactions on Information Systems, vol. 20, Issue 1, Jan. 2002, 23 pages.

Xu, et al., "Query Expansion Using Local and Global Document Analysis", Retrieved at <<http://www.eng.utah.edu/~cs7861/papers/XuCroft-SIGIR96.pdf>>, In Proceedings of the 19th Annual International ACM SIGIR Conference on Research and Development in Information Retrieval, Aug. 18, 1996, 8 pages.

Xu, et al., "Learning Similarity Function for Rare Queries", Retrieved at <<http://delivery.acm.org/10.1145/1940000/1935912/p615-xu.pdf>>, In Proceedings of the Fourth ACM International Conference on Web Search and Data Mining, Feb. 9, 2011, 10 pages.

Zhai, et al., "Model-based Feedback in the Language Modeling Approach to Information Retrieval", Retrieved at <<http://sifaka.cs.uiuc.edu/czhai/pub/cikm2001-fb.pdf>>, In Proceedings of the Tenth International Conference on Information and Knowledge Management, Nov. 5, 2001, 8 pages.

Zhai, et al., "A Study of Smoothing Methods for Language Models Applied to Ad Hoc Information Retrieval", Retrieved at <<http://www.iro.umontreal.ca/~nie/IFT6255/zhai-lafferty.pdf>>, In the 24th Annual International ACM SIGIR Conference on Research and Development in Information Retrieval, Sep. 9, 2001, 9 pages.

"International Search Report and Written Opinion for PCT Patent Application No. PCT/US2014/047920", Mailed Date: Dec. 4, 2014, 9 pages.

* cited by examiner

QUERY EXPANSION AND QUERY-DOCUMENT MATCHING USING PATH-CONSTRAINED RANDOM WALKS

BACKGROUND

Term mismatch can be a challenge when performing a search. For instance, a query and its relevant documents are often composed using different vocabularies and language styles, which can cause term mismatch. Conventional algorithms utilized by search engines to match documents to queries may be detrimentally impacted by term mismatch, and thus, query expansion (QE) is oftentimes employed to address such challenge. Query expansion can expand a query issued by a user with additional relevant terms, called expansion terms, so that more relevant documents can be retrieved.

Various conventional QE techniques have been implemented for information retrieval (IR). Some traditional QE techniques based on automatic relevance feedback (e.g., explicit feedback and pseudo-relevance feedback (PRF)) can enhance performance of IR. Yet, such techniques may be unable to be directly applied to a commercial web search engine because relevant documents may be unavailable. Moreover, generation of pseudo-relevant documents can employ multi-phase retrieval, which may be expensive and time-consuming to perform in real time.

QE techniques, developed recently, utilize search logs (e.g., clickthrough data). These techniques, called log-based QE, can also derive expansion terms for a query from a (pseudo-)relevant document set. However, different from techniques based on automatic relevance feedback, the relevant set can be identified in log-based QE techniques from user clicks recorded in search logs. For example, the set of (pseudo-)relevant documents of an input query can be formed by including the documents that have been previously clicked for the query. Many conventional log-based QE techniques use a global model that is pre-computed from search logs. The model can capture the correlation between query terms and document terms, and can be used to generate expansion terms for the input query on the fly.

Despite the effectiveness of the log-based QE techniques, such approaches can suffer from various problems. For instance, data sparseness can impact effectiveness of log-based QE techniques. A significant portion of queries may have few or no clicks in the search logs, as stated by Zipf's law. Moreover, ambiguity of search intent can detrimentally impact log-based QE techniques. For example, a term correlation model may fail to distinguish the search intent of the query term "book" in "school book" from that in "hotel booking". Although the problem can be partially alleviated by using correlation models based on phrases and concepts, there may be scenarios where the search intent is unable to be correctly identified without use of global context. For instance, the query "why six bottles in one wrap" can be about a package, and the intent of the query "Acme baked bread" can concern looking for a bakery in California. In such cases, a (pseudo-)relevant documents set of the input query, if available, can be more likely to preserve the original search intent than the global correlation model.

SUMMARY

Described herein are various technologies that pertain to use of path-constrained random walks for query expansion and/or query document matching. Clickthrough data from search logs can be represented as a computer-implemented labeled and directed graph. Path-constrained random walks (PCRW) can be executed over the computer-implemented labeled and directed graph for query expansion and/or document-query matching. The path-constrained random walks can be executed over the labeled and directed graph based upon an input query. The labeled and directed graph can include a first set of nodes that are representative of queries included in the clickthrough data from the search logs. Moreover, the labeled and directed graph can include a second set of nodes that are representative of documents included in the clickthrough data from the search logs. The labeled and directed graph can further include a third set of nodes that are representative of words from the queries and the documents. The labeled and directed graph can also include edges between nodes that are representative of relationships between the queries, the documents, and the words. The path-constrained random walks can include traversals over edges of the graph between nodes. Further, a score for a relationship between a target node and a source node representative of the input query can be computed based at least in part upon the path-constrained random walks.

In accordance with various embodiments, query expansion techniques based on path-constrained random walks can be implemented. Accordingly, the target node of the path-constrained random walks can be representative of a candidate query expansion term (e.g., the third set of nodes that are representative of the words from the queries and the documents can include the target node). Thus, the score for the relationship between the target node representative of the candidate query expansion term and the source node representative of the input query can be computed. Such score can be computed as a learned combination of the path-constrained random walks on the labeled and directed graph between the target node representative of the candidate query expansion term and the source node representative of the input query. The score for the relationship can be a probability of picking the candidate query expansion term for the input query.

In accordance with other embodiments, query-document matching techniques based upon path-constrained random walks over the labeled and directed graph can be implemented. Thus, the target node of the path-constrained random walks can be representative of a candidate document (e.g., the second set of nodes that are representative of the documents included in the clickthrough data from the search logs can include the target node). Accordingly, the score for the relationship between the target node representative of the candidate document and the source node representative of the input query can be computed. The score can be computed as a learned combination of the path-constrained random walks on the labeled and directed graph between the target node representative of the candidate document and the source node representative of the input query. Further, the score for the relationship can be a probability of the candidate document being relevant to the input query.

Pursuant to various embodiments, the score for the relationship between the target node and the source node representative of the input query can be computed by determining respective values for the path-constrained random walks between the target node and the source node representative of the input query. For instance, the path-constrained random walks can traverse the edges of the graph between the nodes from the source node representative of the input query to the target node in accordance with differing path types. A path type can include a sequence of relations between the nodes in the graph for traversing as part of a corresponding path-constrained random walk. Thus, the path type can be a sequence of edge labels for edges included in the labeled and directed graph that can be followed during execution of the corresponding path-constrained random walk. Moreover, the respective values for the path-constrained random walks that traverse the edges of the graph between the nodes from the source node representative of the input query to the target node in accordance with the differing path types can be combined to compute the score for the relationship between the target node and the source node representative of the input query.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
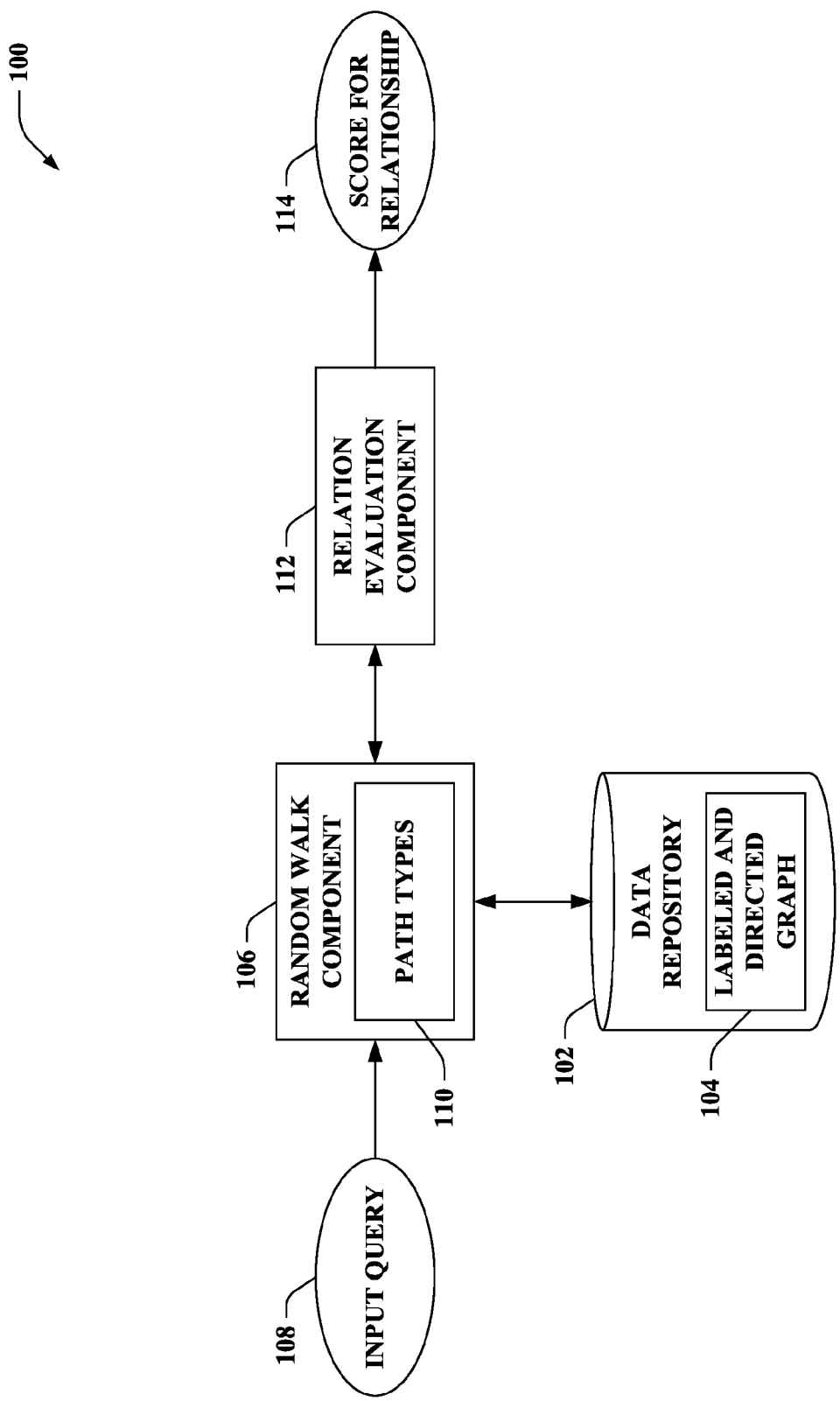
FIG. 1 illustrates a functional block diagram of an exemplary system that executes path-constrained random walks.

Various technologies pertaining to use of path-constrained random walks for query expansion and/or query-document matching are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, query expansion and/or query-document matching based on path-constrained random walks can be implemented. Clickthrough data from search logs can be represented as a labeled and directed graph. For query expansion, a probability of picking a candidate query expansion term for an input query is computed by a learned combination of path-constrained random walks on the graph. Moreover, for query document matching, a probability of a candidate document being relevant to an input query can be computed by a learned combination of path-constrained random walks on the graph.

A principled framework that incorporates disparate models in a unified manner is provided herein. For instance, for query expansion, the framework can be generic by covering various QE models as special cases and flexible by enabling a variety of information to be combined in a unified manner. Moreover, the framework supports incorporating additional QE models (e.g., enabling QE model(s) to be later added or removed). Further, the path-constrained random walk-based techniques provided herein can effectively expand rare queries (e.g., low-frequency queries that are unseen in search logs) and provide enhanced performance as compared to conventional QE techniques.

Referring now to the drawings, FIG. 1 illustrates a system 100 that executes path-constrained random walks. For example, the system 100 can implement query expansion based upon the path-constrained random walks. According to another example, the system 100 can implement query-document matching based upon the path-constrained random walks.

The system 100 includes a data repository 102 that retains a labeled and directed graph 104. Search logs, which can include clicked query-document pairs, can be represented as the labeled and directed graph 104, which includes three types of nodes representing respectively queries, documents, and words (e.g., candidate expansion terms). Thus, the labeled and directed graph 104 includes a first set of nodes that are representative of queries included in clickthrough data from the search logs, a second set of nodes that are representative of documents included in the clickthrough data from the search logs, and a third set of nodes that are representative of words from the queries and the documents. Moreover, the labeled and directed graph 104 includes edges between nodes that are representative of relationships between the queries, the documents, and the words. The edges between the nodes included in the labeled and directed graph 104 are labeled by respective relations. The edges in the labeled and directed graph 104 can further be assigned respective edge scores based upon relation-specific probabilistic models for the respective relations.

The system 100 further includes a random walk component 106 that can receive an input query 108. The random walk component 106 can execute path-constrained random walks over the labeled and directed graph 104 based upon the input query 108. The path-constrained random walks executed by the random walk component 106 can include traversals over edges of the graph 104 between nodes. The path-constrained random walks traverse the edges of the graph 104 between the nodes in accordance with predefined path types 110. Each of the predefined path types 110 can include a respective sequence of relations between the nodes in the graph 104 for traversing as part of a corresponding path-constrained random walk executed by the random walk component 106.

The path-constrained random walks executed by the random walk component 106 over the labeled and directed graph 104 instantiate respective differing path types 110. The path-constrained random walks executed by the random walk component 106 can begin at a source node representative of the input query 108. Moreover, the path-constrained random walks can traverse edges of the graph 104 between nodes in accordance with the differing predefined path types 110. For instance, a given path-constrained random walk can traverse edges of the graph 104 between nodes in accordance with a corresponding one of the path types 110, a disparate path-constrained random walk can traverse edges of the graph 104 between nodes in accordance with a disparate corresponding one of the path types 110, and so forth. Further, the path-constrained random walks can end at a target node.

The system 100 also includes a relation evaluation component 112 that computes a score 114 for a relationship between a target node and the source node representative of the input query 108 based at least in part upon the path-constrained random walks. For instance, the relation evaluation component 112 can determine respective values for the path-constrained random walks between the target node and the source node representative of the input query 108, where the path-constrained random walks traverse the edges of the graph 104 between the nodes from the source node representative of the input query 108 to the target node in accordance with the differing path types 110. Moreover, the relation evaluation component 112 can combine the respective values for the path-constrained random walks to compute the score 114 for the relationship between the target node and the source node representative of the input query 108. According to various embodiments, weights can be assigned to the differing path types 110. Thus, the relation evaluation component 112 can combine the respective values for the path-constrained random walks that traverse the edges of the graph 104 between the nodes from the source node representative of the input query 108 to the target node in accordance with the differing path types 110 as a function of the weights assigned to the differing path types 110.

While much of the aforementioned discussion pertains to computing the score 114 for the relationship between the target node and the source node that represents the input query 108, it is to be appreciated that scores for relationships between substantially any number of target nodes and the source node that represents the input query 108 can similarly be computed based at least in part upon respective path-constrained random walks. Moreover, such scores for the relationships between the target nodes and the source node can be ranked. For instance, a ranked list (e.g., of the target nodes) can be output based upon the respective scores for the corresponding relationships between the target nodes and the source node that represents the input query 108.

Again, pursuant to various examples, the system 100 can implement query expansion based upon the path-constrained random walks over the labeled and directed graph 104 executed by the random walk component 106. Accordingly, the third set of nodes of the labeled and directed graph 104 that are representative of the words from the queries and the documents can include the target node. Thus, the target node can be representative of a candidate query expansion term. Further, the score 114 for the relationship can be a probability of picking the candidate query expansion term for the input query 108.

According to other examples, the system 100 can implement query-document matching based upon the path-constrained random walks over the labeled and directed graph 104 executed by the random walk component 106. Thus, the second set of nodes of the labeled and directed graph 104 that are representative of the documents included in the click-through data from the search logs can include the target node. Hence, the target node can be representative of a candidate document. Moreover, the score 114 for the relationship can be a probability of the candidate document being relevant to the input query 108.

Figure 2:
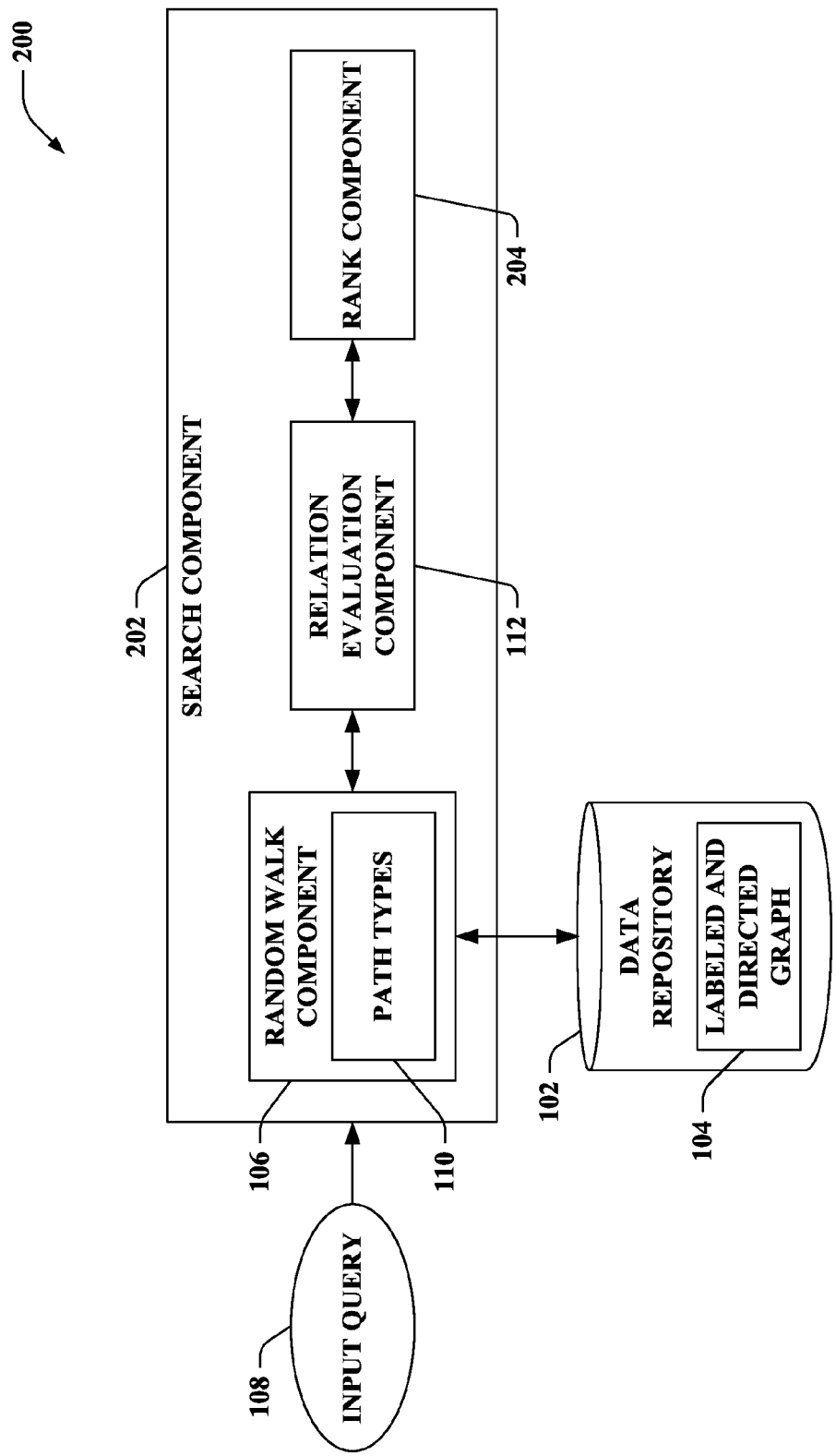
FIG. 2 illustrates a functional block diagram of an exemplary system that executes path-constrained random walks as part of a search.

Now turning to FIG. 2, illustrated is a system 200 that executes path-constrained random walks as part of a search. The system 200 includes the data repository 102, which retains the labeled and directed graph 104, and a search component 202. Further, the search component 202 can include the random walk component 106 and the relation evaluation component 112; yet, according to other examples (not shown), it is contemplated that the random walk component 106 and/or the relation evaluation component 112 can be separate from the search component 202.

The search component 202 can execute substantially any type of search (e.g., web searches, desktop searches, etc.). The search component 202, for example, can be a search engine. Thus, by way of illustration, the search component 202 can be a web search engine, a desktop search engine, or the like; however, it is to be appreciated that the claimed subject matter is not limited to the foregoing illustrations.

The search component 202 can receive the input query 108 (e.g., the input query 108 can desirably be input to the search component 202). Further, the random walk component 106 can execute the path-constrained random walks over the labeled and directed graph 104 based upon the input query 108. The relation evaluation component 112 can compute a score for a relationship between a target node and a source node that represents the input query 108 based at least upon the path-constrained random walks.

Moreover, the search component 202 can include a rank component 204. It is contemplated that path-constrained random walks can be executed over the labeled and directed graph 104 based upon the input query 108 for a plurality of target nodes. The relation evaluation component 112 can compute respective scores for the relationships between such target nodes and the source node that represents the input query 108 based upon the respective path-constrained random walks. Further, the rank component 204 can output a ranked list based upon the respective scores for the corresponding relationships between target nodes and the source node that represents the input query 108. Moreover, the search component 202 can perform a search based upon the ranked list.

In accordance with an example, query expansion can be implemented based upon the path-constrained random walks over the labeled and directed graph 104 executed by the random walk component 106. Following this example, the rank component 204 can output a ranked list of candidate query expansion terms based upon respective scores for corresponding relationships between target nodes representative of the candidate query expansion terms and the source node representative of the input query 108.

By way of another example, query-document matching can be implemented based upon the path-constrained random walks over the labeled and directed graph 104 executed by the random walk component 106. Accordingly, the rank component 204 can output a ranked list of candidate documents based upon respective scores for corresponding relationships between target nodes representative of the candidate documents and the source node representative of the input query 108.

Reference is again made to the exemplary scenario where query expansion is implemented. Thus, the target node can represent a candidate query expansion term. The search component 202 can select the candidate query expansion term based at least in part upon the score for the relationship between the target node representative of the candidate query expansion term and the source node representative of the input query 108 (e.g., based upon a position of the candidate query expansion term in the ranked list output by the rank component 204). According to an example, responsive to selecting the candidate query expansion term, the search component 202 can execute a search over a plurality of documents based at least in part upon the candidate query expansion term. Pursuant to another example, responsive to selecting the candidate query expansion term, the search component 202 can cause the candidate query expansion term to be displayed as a suggested query (e.g., to a user on a display screen of a user device). Following this example, if the suggested query corresponding to the candidate query expansion term is chosen (e.g., based upon user input), the search component 202 can execute a search over a plurality of documents based at least in part upon the candidate query expansion term. By way of illustration, the search component 202 can cause a top K candidate query expansion terms in the ranked list output by the rank component 204 to be displayed as suggested queries, where K can be substantially any integer. Following this illustration, one or more of the suggested queries can be chosen (e.g., based upon user input); accordingly, the search component 202 can execute a search based at least in part upon the one or more suggested queries that are chosen.

Moreover, reference is again made to the exemplary scenario where query-document matching is implemented. Accordingly, the target node can represent a candidate document. The search component 202 can return the candidate document responsive to execution of a search over a plurality of documents. The candidate document, for instance, can be returned by the search component 202 based at least in part upon the score for the relationship between the target node representative of the candidate document and the source node representative of the input query 108.

It is noted that many of the following examples set forth herein pertain to use of the path-constrained random walks over the labeled and directed graph 104 for query expansion. It is to be appreciated, however, that such examples can be extended to scenarios where the path-constrained random walks over the labeled and directed graph 104 are employed for query document matching.

Figure 3:
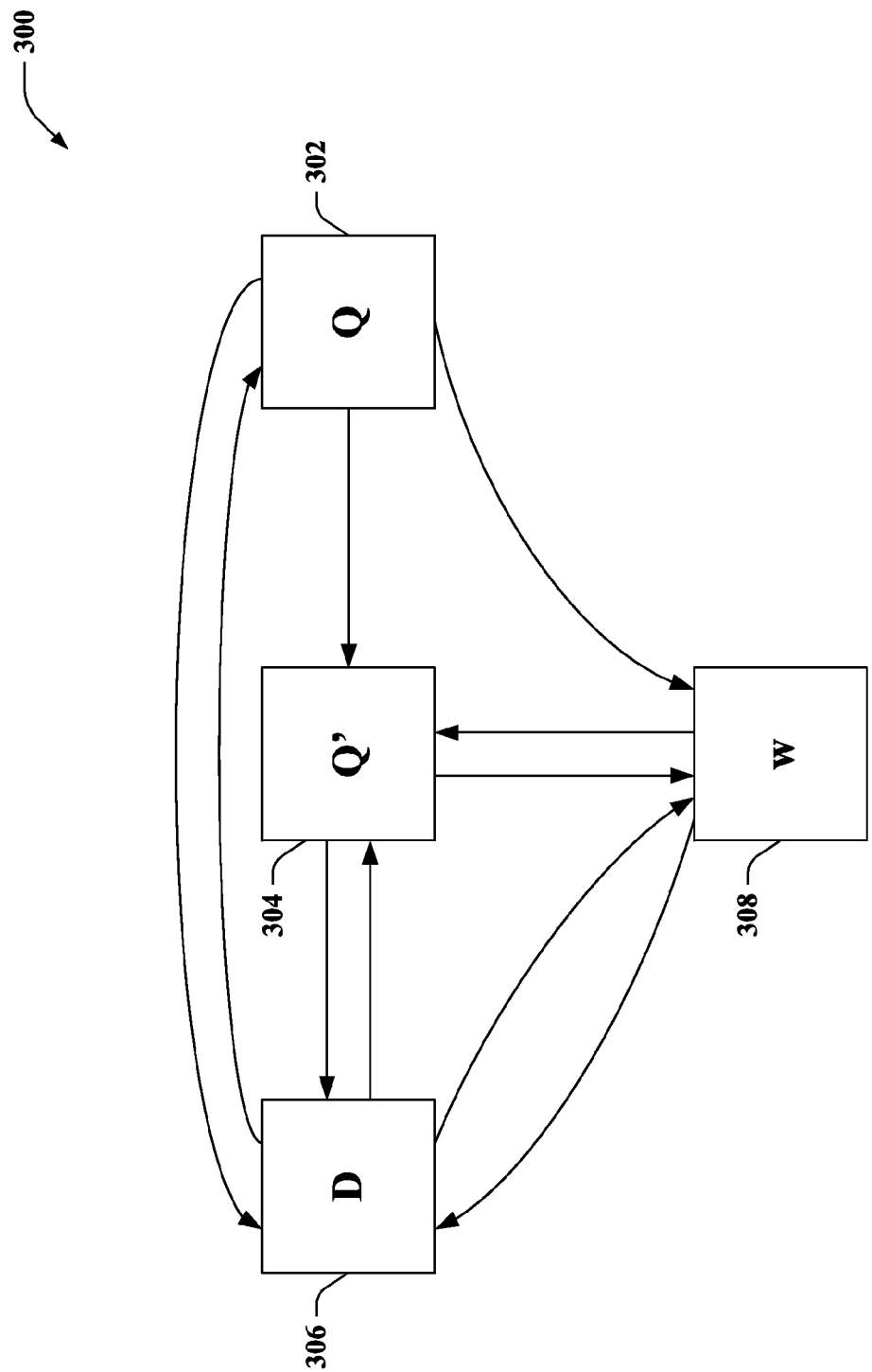
FIG. 3 illustrates an exemplary labeled and directed graph.

With reference to FIG. 3, illustrated is an exemplary labeled and directed graph 300 (e.g., the labeled and directed graph 104). The graph 300 includes a node 302 that represents an input query Q (e.g., a source node), nodes 304 that represent queries Q' included in the clickthrough data from the search logs, nodes 306 that represent documents D included in the clickthrough data from the search logs, and nodes 308 that represent words w (collectively referred to herein as nodes 302-308). Moreover, the graph 300 includes edges between the nodes 302-308.

For each path in the graph 300 that links the input query Q to a candidate expansion term w (e.g., one of the nodes 308, a target node, etc.), there is a path type π (e.g., one of the path types 110), defined by a sequence of edge labels. Each path type can be viewed as a particular process of generating w from Q. Further, a generation probability $P(w|Q,\pi)$ is computed by random walks along the paths that instantiate the path type π, referred to as path-constrained random walks.

Various log-based QE models can be formulated in the framework of path-constrained random walks by defining particular path types. The path-constrained random walks provide a generic and flexible modeling framework. For instance, the path-constrained random walks can cover various log-based QE models as special cases, while allowing for incorporation of other QE models (e.g., later developed QE models). For example, a rich set of walk behaviors that support a variety of labeled edges can be defined, where different information can be used at different stages of the walk.

Moreover, because different QE approaches often rely on different sources and are potentially complimentary, it may be desirable to combine them to address data sparseness and help disambiguate search intent. For example, while automatic feedback techniques using (pseudo-)relevant documents may retain search intent but suffer from data sparseness especially for rare queries, techniques based on global term correlation models may be applicable to both common and rare queries but, due to the limited context information it captures, may lead to an unexpected shift of search intent. The path-constrained random walks provide a flexible mathematical framework in which different QE features, specified by path types π, can be incorporated in a unified way. Formally, in the path-constrained random walk-based QE approach set forth herein, a probability of picking w for a given Q, P(w|Q), can be computed (e.g., by the relation evaluation component 112) by a learned combination of path-constrained random walks on the graph 300 (e.g., $P(w|Q)=\Sigma_{\pi \in B} \lambda_\pi P(w|Q,\pi)$), where $\lambda_\pi$'s are the combination weights learned on training data). Accordingly, the use of path-constrained random walks can enhance robustness of QE to data sparseness while helping disambiguate search intents.

Consider the directed, edge-labeled graph G=(C,T) (e.g., the graph 300), where T⊆C×R×C is the set of labeled edges (also known as triples) (c,r,c'). Each triple represents an instance r(c,c') of the relation r∈R. For QE, a separate probabilistic model $\theta_r$ can be used for each relation r. A probabilistic model is used to assign a score to each edge. The score is the probability of reaching c' from c with a one-step random walk with edge type r, $P(c'|c,\theta_r)$.

A path type in G is a sequence $\pi=<r_1, \ldots, r_m>$. An instance of the path type is a sequence of nodes $c_0, \ldots, c_m$, such that $r_i(c_{i-1},c_i)$. Each path type specifies a real-value feature. For a given node pair (s,t), where s is a source node and t is a target node, the value of the feature it is P(t|s,π) (e.g., the probability of reaching t from s by a random walk that instantiates the path type, also known as a path-constrained random walk). Specifically, suppose that the random walk has just reached $c_i$ by traversing edges labeled $r_1, \ldots, r_i$ with Q=$c_0$. Then $c_{i+1}$ is drawn at random, according to $\theta_{r_{i+1}}$, from nodes reachable by edges labeled $r_{i+1}$. A path type it is active for the pair (s,t) if P(t|s,π)>0.

Let B={⊥,$\pi_1, \ldots, \pi_n$} be the set of path types of length no greater than l that occur in the graph 300 together with the dummy type ⊥, which represents the bias feature. For instance, P(t|s,⊥)=1 may be set for nodes s,t. The score for whether the target node t is related to the source node s can be given by:

$$P(t|s) = \sum_{\pi \in B} \lambda_\pi P(t|s, \pi) \quad (1)$$

In the foregoing, where $\lambda_\pi$ is the weight of feature π. The model parameters to be learned are the vector $\lambda=<\lambda_\pi>_{\pi \in B}$. Moreover, the construction of B and the estimation of λ can be application specific. For QE, the source node is the input query to be expanded Q (e.g., the node 302) and target node is a candidate expansion term w (e.g., one of the nodes 308).

Thus, Equation (1) gives the probability of whether w is an appropriate expansion term of Q.

Figure 4:
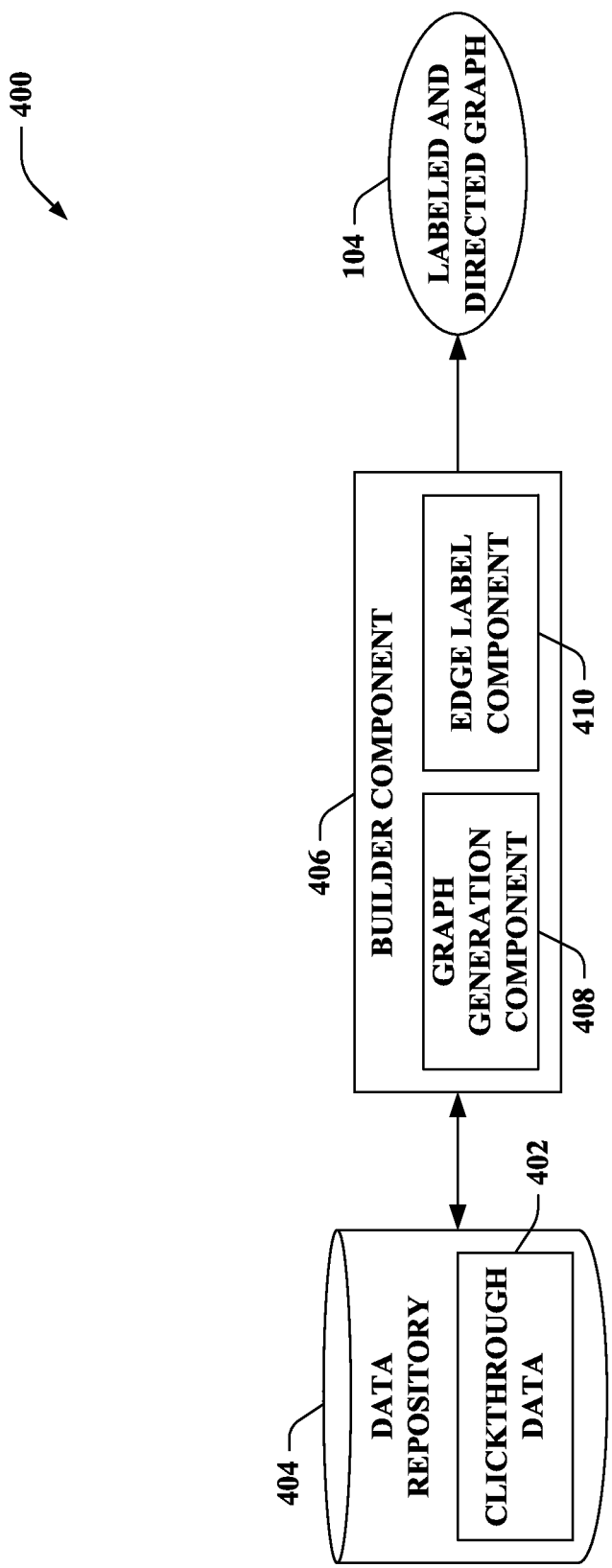
FIG. 4 illustrates a functional block diagram of an exemplary system that constructs the labeled and directed graph based upon clickthrough data from search logs.

With reference to FIG. 4, illustrated is a system 400 that constructs the labeled and directed graph 104 based upon clickthrough data 402 from search logs. The clickthrough data 402 can be retained in a data repository 404. It is contemplated that the data repository 404 can be the data repository 102 of FIG. 1; yet, the claimed subject matter is not so limited. The clickthrough data 402 can include query document pairs.

Moreover, the system 400 includes a builder component 406 that constructs the labeled and directed graph 104 from the clickthrough data 402. The builder component 406 can further include a graph generation component 408 and an edge label component 410. The graph generation component 408 can generate nodes for documents, queries, and words. Further, the graph generation component 408 can create edges linking the nodes.

The edge label component 410 can assign labels to the edges. More particularly, the edge label component 410 can label each edge in the graph by a respective relation. Further, the edge label component 410 can assign each edge in the labeled and directed graph 104 a respective edge score. The edge score for a given edge can be generated by the edge label component 410 based upon a relation-specific probabilistic model for the relation of the edge.

The clickthrough data 402 includes a list of query-document pairs. Each pair includes a query and a document which has one or more user clicks for the query. Thus, the graph generation component 408 can represent the search logs as a graph G=(C,T) (e.g., the labeled and directed graph 104, the graph 300 of FIG. 3). Again, the graph generation component 408 defines three types of nodes to represent respectively queries, documents, and words that occur in queries and documents. A query in the search logs, denoted by Q', has clicked document(s). An input query to be expanded, denoted by Q, can be a new, low-frequency query without clicked documents. Such a query can be referred to as a rare query. However, it is also contemplated that the input query to be expanded Q' can alternatively be a query in the search logs that has clicked document(s). Q and Q' are treated as different nodes in G (as shown in FIG. 3).

The edge label component 410 labels each edge in the graph 104 by a relation r. Further, the edge label component 410 scores each edge in the graph 104 using a relation-specific model $\theta_r$. The edge score is the probability of reaching a target node t from a source node s with a one-step random walk with edge type r, $P(t|s,\theta_r)$. Examples of relations r and their corresponding scoring functions score (s→t;r) are shown below in Table 1.

TABLE 1

| ID | Relation r | Scoring function |
|---|---|---|
| 1 | similar. Q2Q' | Cosine similarity between the term vectors of Q and Q', where term weights are assigned using the BM25 function. |
| 2 | translate. Q2Q' | $\log \prod_{q' \in Q'} \sum_{q \in Q} P_{tm}(q'|q) \frac{tf(q;Q)}{|Q|}$ |
| 3 | click. Q2D | $\log P(D|Q) = \log \frac{click(Q, D)}{\sum_{D_i \in D} click(Q, D_i)}$ |

TABLE 1-continued

| ID | Relation r | Scoring function |
|---|---|---|
| 4 | click. D2Q | $\log P(Q|D) = \log \frac{click(Q, D)}{\sum_{Q_i \in Q} click(Q_i, D)}$ |
| 5 | generate. Q2w | $\log \left( (1-\alpha) \frac{tf(w; Q)}{|Q|} + \alpha \frac{cf(w)}{|C|} \right)$ |
| 6 | translate. Q2w | $\log \sum_{q \in Q} P_{tm}(w|q) \frac{tf(q; Q)}{|Q|}$ |
| 7 | generate. Q'2w | $\log \left( (1-\alpha) \frac{tf(w; Q')}{|Q'|} + \alpha \frac{cf(w)}{|C|} \right)$ |
| 8 | translate. Q'2w | $\log \sum_{q' \in Q'} P_{tm}(w|q') \frac{tf(q'; Q')}{|Q'|}$ |
| 9 | click. Q'2D | $\log P(D|Q') = \log \frac{click(Q', D)}{\sum_{D_i \in D} click(Q', D_i)}$ |
| 10 | generate. D2w | $\log \left( (1-\beta) \frac{tf(w; D)}{|D|} + \beta \frac{cf(w)}{|C|} \right)$ |
| 11 | translate. D2w | $\log \sum_{w_i \in D} P_{tm}(w|w_i) \frac{tf(w_i; D)}{|D|}$ |
| 12 | click. D2Q' | $\log P(Q'|D) = \log \frac{click(Q', D)}{\sum_{Q'_i \in Q} click(Q'_i, D)}$ |
| 13 | generate. w2D | $\log P(D|w) = \log \frac{P_{lm}(w|D)P(D)}{\sum_{D_i \in D} P_{lm}(w|D_i)P(D_i)},$ where $P_{lm}(w|D) = (1-\beta) \frac{tf(w; D)}{|D|} + \beta \frac{cf(w)}{|C|}$ and $P(D) = \frac{\sum_{Q \in Q} click(Q, D)}{N}$ |
| 14 | generate. w2Q' | $\log P(Q'|w) = \log \frac{P_{lm}(w|Q')P(Q')}{\sum_{Q'_i \in Q} P_{lm}(w|Q_i)P(Q_i)},$ where $P_{lm}(w|Q) = (1-\alpha) \frac{tf(w; Q)}{|Q|} + \alpha \frac{cf(w)}{|C|}$ and $P(Q) = \frac{\sum_{D \in D} click(Q, D)}{N}$ |

As noted above, Table 1 sets forth examples of relations r and their corresponding scoring functions. As provide above, $tf(q;Q)$ is the number of times term q occurs in query Q, and $|Q|$ is the length of query Q. $tf(w;D)$ is the number of times term w occurs in D, and $|D|$ is the length of document D. The $cf(w)$ and $|C|$ values are analogously defined on the collection level, where the collection includes the set of documents in search logs. $P_{tm}(\cdot)$ is a word translation probability assigned by a translation model trained on query-title pairs derived from the clickthrough data 402. $P_{tm}(q'|q)$ in #2 is also assigned by the same query-title translation model based on the assumption that an appropriate expansion term q' is likely to occur in the titles of the clicked documents. click (Q',D) is the number of times document D is clicked for Q' in search logs. In #11 and #12, D is the full set of documents in the search logs, Q is the full set of queries in the search logs, and N is the total number of clicks in the search logs (e.g., $N=\Sigma_{Q\in Q}\Sigma_{D\in D}$ click(Q,D)). Further, a and are model hyperparameters that control smoothing for query and document language models, respectively.

When scoring each edge in the graph 104 using the relation-specific model $\theta_r$, the edge label component 410 can compute the edge score as a probability, $P(t|s,\theta_r)$, via softmax as follows:

$$P(t \mid s, \theta_r) = \frac{\exp(\text{score}(s \to t; r))}{\sum_{t_i} \exp(\text{score}(s \to t_i; r))} \quad (2)$$

It is noted that conventional path-constrained random walk models commonly lack $\theta_r$, and the edge score is thus traditionally computed as:

$$P(t \mid s, r) = \frac{I(r(s, t))}{\sum_{t'} I(r(s, t'))}$$

In the foregoing, I(r(s,t)) is an indicator function that takes value 1 if there exists an edge with type r that connects s to t. In contrast, introducing $\theta_r$ as set forth herein allows for incorporation of various models that have been developed for QE and document ranking models.

The exemplary scoring functions in Table 1 are generally in four categories. The first category includes functions for the similar.* relation (e.g., #1), and is based on the BM25 model. The second category, which includes functions for the relations of generate.* (e.g., #4), uses unigram language models with Bayesian smoothing using Dirichlet priors. The third category, including functions for click.* (e.g., #3), uses a click model. The fourth category, including functions for translation.* (e.g., #5), uses translation models, where, if clickthrough data 402 is available for model training, the word translation probabilities $P_{tm}$ are estimated on query-document pairs by assuming that a query is parallel to the documents clicked on for that query.

Again, reference is made to FIG. 3. Given the graph 300, any path type π that starts with the input query node Q (e.g., the node 302) and ends with a word node w (e.g., one of the nodes 308) defines a real-value feature, which can be viewed as a QE model (or QE feature). The feature value is the probability of picking w as an expansion term P(w|Q,π) by path-constrained random walks of type it. Table 2 provides examples of path types, which can be used as features in the path-constrained random walk model.

TABLE 2

| ID | path type π (Comments) |
| --- | --- |
| TM1 | <translate. Q2w> (w is generated using clickthrough-based translation model from Q) |
| TM2 | <generate. Q2w, generate. w2D, generate. D2w> (variant of TM1 where translation model is trained via 2-step random walks on word-document graph) |
| TM3 | <generate. Q2w, generate. w2D, generate. D2w, generate. w2D, generate. D2w> (variant of TM2 where 4-step random walks are used) |
| TM4 | <generate. Q2w, generate. w2Q', generate. Q'2w> (variant of TM2 where random walks are performed on word-query graph) |
| TM5 | <generate. Q2w, generate. w2Q', generate. Q'2w, generate. w2Q', generate. Q'2w> (variant of TM4 where 4-step random walks are used) |
| SQ1 | <similar. Q2Q', generate. Q'2w> (w is generated from similar queries Q' of Q, where query similarity is based on BM25) |
| SQ2 | <translate. Q2Q', generate. Q'2w> (variant of SQ1 where query similarity is based on clickthrough-based translation model) |
| SQ3 | <similar. Q2Q', click. Q'2D, click. D2Q', generate. Q'2w> (variant of SQ1 where similar query set is enriched by 2-step random walks on query-document graph) |
| SQ4 | <similar. Q2Q', click. Q'2D, click. D2Q', click. Q'2D, click. D2Q', generate. Q'2w> (variant of SQ3 where 4-step random walks are used) |
| SQ5 | <translate. Q2Q', click. Q'2D, click. D2Q', generate. Q'2w> (variant of SQ2 where similar query set is enriched by 2-step random walks on query-document graph) |
| SQ6 | <translate. Q2Q', click. Q'2D, click. D2Q', click. Q'2D, click. D2Q', generate. Q'2w> (variant of SQ5 where 4-step random walks are used) |
| RD1 | <similar. Q2Q', click. Q'2D, generate. D2w> (w is generated from pseudo-relevant documents D clicked for similar queries Q' of Q) |
| RD2 | <translate. Q2Q', click. Q'2D, generate. D2w> (variant of RD1 where query similarity is computed via translation model) |
| RD3 | <similar. Q2Q', click. Q'2D, translate. D2w> (variant of RD1 where w is generated from D using translation model) |
| RD4 | <similar. Q2Q', click. Q'2D, click. D2Q', click. Q'2D, generate. D2w> (variant of RD1 where set of D is enriched by 2-step random walks on query-document graph) |
| RD5 | <similar. Q2Q', click. Q'2D, click. D2Q', click. Q'2D, click. Q'2D, generate. D2w> (variant of RD3 where 4-step random walks are used) |
| RD6 | <translate. Q2Q', click. Q'2D, click. D2Q', click. Q'2D, generate. D2w> (variant of RD2 where set of D is enriched by 2-step random walks on query-document graph) |

TABLE 2-continued

| ID | path type π (Comments) |
|---|---|
| RD7 | <translate. Q2Q', click. Q'2D, click. D2Q', click. Q'2D, click. D2Q', click. Q'2D, generate. D2w> (variant of RD6 where 4-step random walks are used) |
| RD8 | <click. Q2D, generate. D2w> (w is generated from pseudo-relevant documents D clicked for query Q) |
| RD9 | <click. Q2D, click. D2Q, click. Q2D, generate. D2w> (variant of RD8 where the set of D is enriched by 2-step random walks on query-document graph) |
| RD10 | <click. Q2D, click. D2Q, click. Q2D, click. D2Q, click. Q2D, generate. D2w> (variant of RD9 where 4-step random walks are used) |

Table 2 provides three categories of QE features: (1) TM features, which perform QE using translation models (e.g., the corresponding path types are specified by IDs from TM1 to TM5 in Table 2), (2) SQ features, which perform QE using similar queries (e.g., SQ1 to SQ6), and (3) RD features, which perform QE using (pseudo-)relevant documents (e.g., RD1 to RD10).

Many log-based QE techniques can use clickthrough-based translation models where term correlations are pre-computed using query-document pairs extracted from clickthrough data. In contrast to approaches based on thesauri either compiled manually or derived from document collections, the log-based techniques that use the translation models can explicitly capture correlation between query terms and document terms. An example of a log-based QE technique that uses a translation model is encoded by the path type TM1, <translate.Q2w>. In case there is not (enough) clickthrough data for model training, a technique using Markov chains can be employed, where the translation probability between two words is computed by random walks on a document-word graph; such technique can be encoded by the path types of TM2 and TM3 in Table 2.

Rare queries oftentimes present a challenge for web search. The expansion of a rare query Q is often performed by adding terms from common queries Q' which are similar to Q. The path-constrained random walk model achieves this by a random walk that instantiates the path type SQ1, (similar.Q2Q', generate.Q'2w). For instance, similar queries can be retrieved by performing random walks on a query-document click graph. Thus, rare query expansion can be enhanced using a larger set of similar queries identified by repeatedly applying random walks following the edges with types click.Q2D and click.D2Q. SQ3 and SQ4 in Table 2 are two examples of such models.

A set of relevant documents D of an input query Q that is seen in the search logs can be formed by collecting the documents that have clicks for that query. Thus, the relevance feedback QE method can be represented as e.g., RD8, <click.Q2D,generate.D2w>

If the input query is a rare query, the set of pseudo-relevant documents can be formed through similar queries Q' (e.g., queries that are similar to the input query) that are in the search logs, e.g., RD1, <similar.Q2Q',click.Q'2D,generate.D2w>

To address the data sparseness problem, more pseudo-relevant documents can be retrieved by performing random walks on a query-document click graph, such as RD4 and RD5 in Table 2.

FIGS. 5-8 illustrate various exemplary path-constrained random walks between a source node 502 that represents an input query Q (e.g., the node 302 of FIG. 3) and a target node 504 that represents a candidate query expansion term $w_1$ (e.g., one of the nodes 308 of FIG. 3). FIGS. 5-8 depict respective portions of the labeled and directed graph 300 of FIG. 3. The examples set forth in FIGS. 5-8 show four differing path types. Yet, it is to be appreciated that the claimed subject matter is not limited to the illustrated examples.

Figure 5:
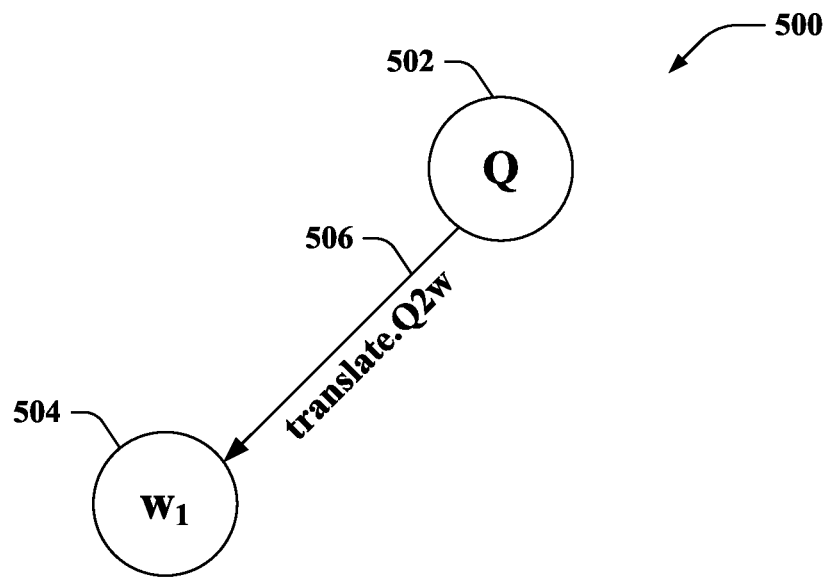
FIGS. 5-8 illustrate various exemplary path-constrained random walks between a source node that represents an input query Q and a target node that represents a candidate query expansion term $w_1$.

FIG. 5 depicts a path-constrained random walk 500 that traverses edges of the labeled and directed graph from the source node 502 to the target node 504 in accordance with the path type TM1 from the Table 2. The path-constrained random walk 500 is a one-step random walk. More particularly, the path-constrained random walk 500 follows an edge 506 labeled by the relation translate.Q2w from the source node 502 to the target node 504.

Figure 6:
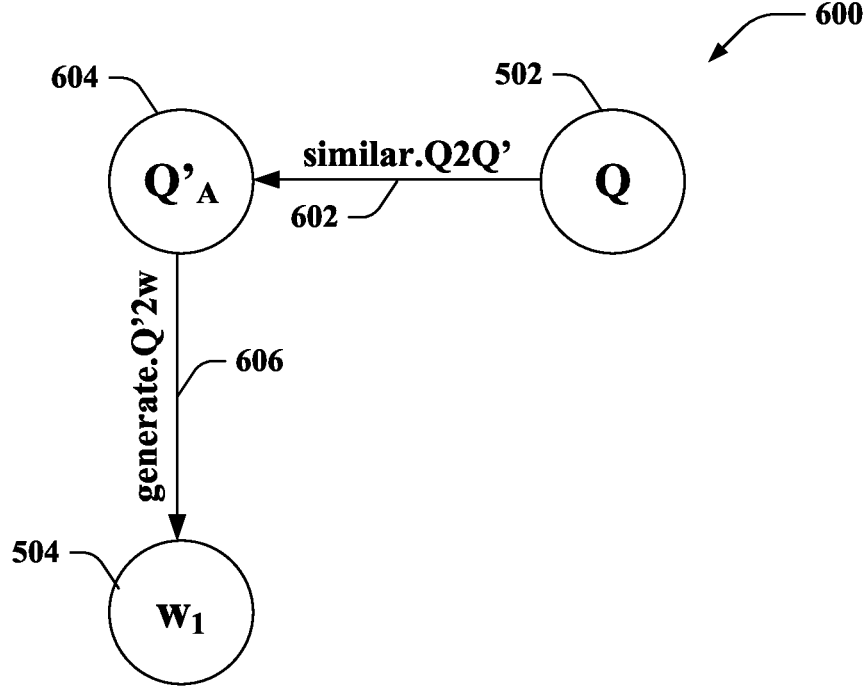

FIG. 6 depicts a path-constrained random walk 600 that traverses edges of the labeled and directed graph from the source node 502 to the target node 504 in accordance with the path type SQ1 from the Table 2. The path-constrained random walk 600 is a two-step random walk. In particular, the path-constrained random walk 600 begins at the source node 502, follows an edge 602 labeled by the relation similar.Q2Q' from the source node 502 to a node 604 that represents a similar query QA (e.g., one of the nodes 304 of FIG. 3), and then follows an edge 606 labeled by the relation generate.Q'2w from the node 604 that represents the similar query QA to the target node 504.

Figure 7:
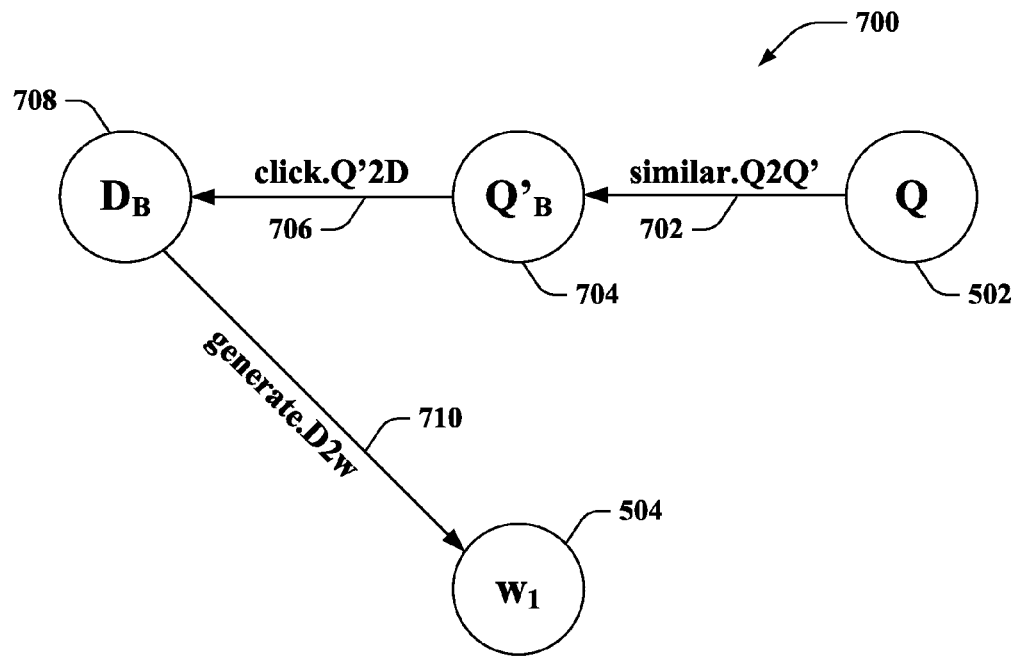

FIG. 7 depicts a path-constrained random walk 700 that traverses edges of the labeled and directed graph from the source node 502 to the target node 504 in accordance with the path type RD1 from the Table 2. The path-constrained random walk 700 is a three-step random walk. In particular, the path-constrained random walk 700 begins at the source node 502, follows an edge 702 labeled by the relation similar.Q2Q' from the source node 502 to a node 704 that represents a similar query $Q'_B$ (e.g., one of the nodes 304 of FIG. 3), then follows an edge 706 labeled by the relation click.Q'2D from the node 704 that represents the similar query $Q'_B$ to a node 708 that represents a document $D_B$ (e.g., one of the nodes 306 of FIG. 3), and then follows an edge 710 labeled by the relation generate. D2w from the node 708 that represents the document $D_B$ to the target node 504.

Figure 8:
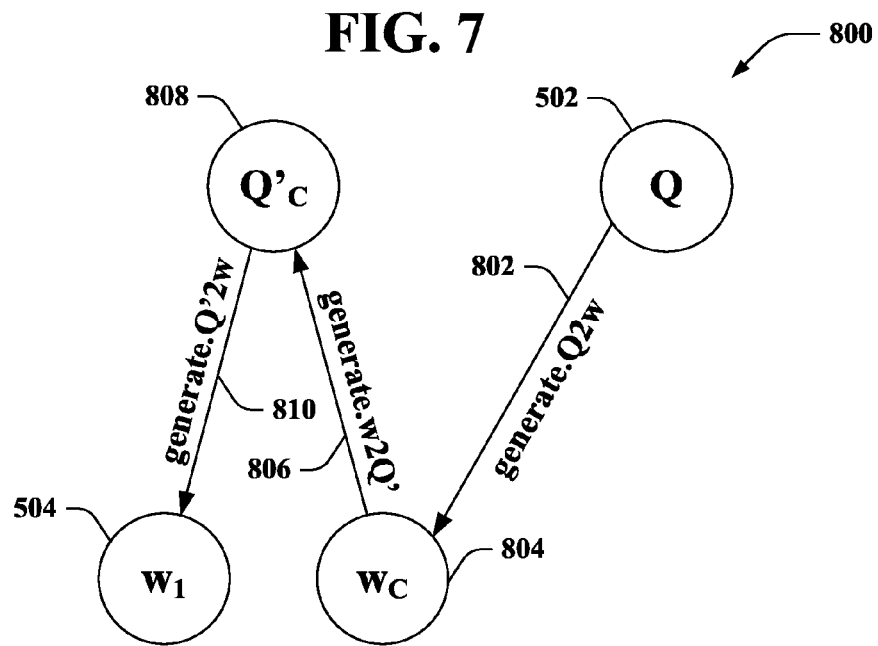

FIG. 8 depicts a path-constrained random walk 800 that traverses edges of the labeled and directed graph from the source node 502 to the target node 504 in accordance with the path type TM4 from the Table 2. The path-constrained random walk 800 is a three-step random walk. More particular, the path-constrained random walk 800 begins at the source node 502, follows an edge 802 labeled by the relation generate.Q2w from the source node 502 to a node 804 that represents a word $w_C$ (e.g., one of the nodes 308 of FIG. 3, representing a word other than the candidate query expansion term $w_1$), then follows an edge 806 labeled by the relation generate. w2Q' from the node 804 that represents the word $w_C$ to a node 808 that represents a similar query $Q'_C$ (e.g., one of the nodes 304 of FIG. 3), and then follows an edge 810 labeled by the relation generate.Q'2w from the node 808 that represents the similar query $Q'_C$ to the target node 504.

Again, reference is made to FIG. 1. The random walk component 106 can implement the random walks as matrix multiplication. As an example, the task of retrieving similar queries can be executed by the random walk component 106 repeatedly applying random walks following click.Q2D and click.D2Q. Let N be the number of query nodes in G (e.g., the labeled and directed graph 104) and M be the number of document nodes. Let A be the N×M matrix with entries $A_{Q,D}$=P(D|Q), called query-document transition matrix, where the probability is calculated from clicks as in #3 in Table 1. Also, let B be the M×N matrix with entries $B_{D,Q}$=P(Q|D), where the probability is calculated from clicks as in #4 in Table 1. A and B are called transition matrices. Thus, using C=AB, the probability of walking from an initial query $Q_0$ to any other query Q in 2k steps can be computed. Moreover, the corresponding probability, which is used to measure query-to-query similarity, is given by $P(Q|Q_0)=C_{Q_0,Q}^k$. Because the matrices A and B are sparse, the matrix product C=AB can be computed efficiently. As k increases, $C^k$ becomes dense and the powers cannot be computed efficiently. However, as k increases, the search intent shifts from the initial query, as the probability spreads out over all queries. Thus, k can be set to 1 or 2, for example.

For QE, the path-constrained random walk model of Equation (1) evaluated by the relation evaluation component 112 can be rewritten as follows:

$$P(w \mid Q) = \sum_{\pi \in B} \lambda_\pi P(w \mid Q, \pi) \quad (3)$$

The foregoing is a weighted linear combination of path features π in B. Thus, the path-constrained random walk model performs QE by ranking a set of combined paths, each for one pair of Q and w (e.g., a candidate expansion term).

The following generally describes construction of B in Equation 3. Given the labeled and directed graph 300, the total number of path types |B| can grow exponentially with an increase of path length. Accordingly, a maximum path length can be set to substantially any integer (e.g., the maximum length can be set to 7 or substantially any other integer). Moreover, a predefined set of relations that are selective, such as shown in Table 1, can be utilized. Given a path type it, due to the number of nodes in G, even with a length limit, the total number of paths that instantiate π can be significant. For example, since a word can translate to any other word based on a smoothed translation model, any node pair (Q', Q) can have a non-zero-score relation translate.Q2Q' (#2 in Table 1), thus making the transition matrix dense. For efficiency, multiplication of transition matrices can be kept sparse by retaining a subset of (partial) paths (e.g., top-1000 (partial) paths) after each step of a random walk.

Further, parameters $\lambda_\pi$ (e.g., weights assigned to the differing path types 110) can be estimated by generating training data and performing parameter estimation using the training data. Training data used for the estimation of parameters $\lambda_\pi$ in Equation (3) is denoted as $D=\{(x_i,y_i)\}$, where $x_i$ is a vector of the path features for the pair $(Q_i,w_i)$. That is, the j-th component of $x_i$ is $P(w_i|Q_i,\pi_i)$, and $y_i$ is a Boolean variable indicating whether $w_i$ is an appropriate expansion term for Q.

Assume a relevance judgment set is developed, for example. The set can include a set of queries. Each query is associated with a set of documents. Each query-document pair has a relevant label. The effectiveness of a document ranking model Score(D,Q) can be evaluated on the set. Whether a word w is an appropriate expansion for a query Q can be determined by examining whether expanding Q with w leads to an enhanced document ranking result. For instance, the following ranking model can be utilized:

$$\text{Score}(D, Q) = \alpha \log P(w \mid \theta_D) + \sum_{q \in Q} P(q \mid \theta_Q) \log P(q \mid \theta_D) \quad (4)$$

As set forth in Equation 4, w is the expansion term under consideration, α is its weight, q is a term in the original query Q, and $\theta_Q$ and $\theta_D$ are query and document models, respectively. The query model $P(q|\theta_Q)$ is estimated via MLE (maximum likelihood estimation) without smoothing as:

$$P(q \mid \theta_Q) = \frac{tf(q; Q)}{|Q|} \quad (5)$$

In the foregoing, tf(q;Q) is the number of times q occurs in Q, and |Q| is the query length. The document model, e.g., $P(q|\theta_D)$, can be estimated via MLE with Dirichlet smoothing as:

$$P(q \mid \theta_D) = \frac{tf(w; D) + \mu P(w \mid C)}{|D| + \mu} \quad (6)$$

Accordingly, tf(w;D) is the number of times w occurs in D, |D| is the document length, μ is the Dirichlet prior (e.g., set to 2000), and P(w|C) is the probability of w on the collection C, which can be estimated via MLE without smoothing.

Equation (4) can be viewed as a simplified form of QE with a single term. It is used to label whether w is an appropriate expansion term for Q. To simplify the training data generation process, it can be assumed that w acts on the query independently from other expansion terms, and each expansion term is added into Q with equal weight, e.g., α=0.01 or α=−0.01.

The training data can be generated as follows. For each query Q in the relevance judgment set, a set of candidate expansion terms $\{w_i\}$ can be formed by collecting terms that occur in the documents that are paired with Q but do not occur in Q. Then $w_i$ can be labeled as an appropriate expansion term for Q if it enhances the effectiveness of ranking document when α=0.01 and detrimentally impacts the effectiveness when α=−0.01. $w_i$ can be negatively labeled if it produces an opposite effect or produces similar effect when α=0.01 or α=−0.01.

Moreover, the parameters $\lambda_\pi$ can be estimated from the training data as follows. Given training data D, the model parameters $\lambda = <\lambda_\pi>_{\pi \in B}$ can be optimized by maximizing the following objective:

$$\mathcal{F}(\lambda) = \sum_{(x,y) \in D} f(x, y; \lambda) - \alpha_1 ||\lambda||_1 - \alpha_2 ||\lambda||_2^2 \quad (7)$$

In the above, $\alpha_1$ and $\alpha_2$ respectively control the strength of the $L_1$-regularization (which helps with structure selection) and $L_2$-regularization (which helps mitigate overfitting). $f(x,y;\lambda)$ is the log-likelihood of the training sample (x,y), and is defined as:

$$f(x, y; \lambda) = y\log P(x, \lambda) + (1 - y)\log(1 - P(x, \lambda)) \quad (8)$$

Moreover, $$P(x, \lambda) \equiv P(y = 1 \mid x, \lambda) = \frac{\exp(\lambda^T x)}{1 + \exp(\lambda^T x)} \quad (9)$$

is the model-predicted probability. The maximization, for example, can be performed using the OWL-QN (Orthant-Wise Limited memory Quasi-Newton) algorithm, which is a version of L-BFGS (limited memory Broyden-Fletcher-Goldfarb-Shanno algorithm) designed to address non-differentiable $L_1$ norm.

The path-constrained random walk-based model of Equation (3) can assign each path type a weight. Such a parameterization is called one-weight-per-path-type. An alternative way of parameterizing the model is one-weight-per-edge-label. For instance, the objective function and optimization procedure noted above can similarly be used for parameter estimation of a one-weight-per-edge-label model. Because the model can be seen as the combination of the path-constrained random walks with each path having its weight set to the product of the edge weights along the path, the gradient of edge weights can be calculated by first calculating the gradient with respect to the paths, and then applying the chain rule of derivative.

In general, the techniques provided herein use search logs for QE for web search ranking. A QE technique based on path-constrained random walks is described, where the search logs are represented as a labeled, directed graph, and the probability of selecting an expansion term for an input query is computed by a learned combination of constrained random walks on the graph. Such path-constrained random walk-based approach for QE is generic and flexible, where various QE models can be incorporated as features, while also allowing for incorporation of additional (e.g., later developed) features, by defining path types with a rich set of walk behaviors. The path-constrained random walk model also provides a principled mathematical framework in which different QE models (e.g., defined as path types or features) can be incorporated in a unified way, thus mitigating susceptible to sparseness of clickthrough data and ambiguous search intent of user queries.

Moreover, as noted herein, while many of the aforementioned examples pertain to utilization of the path-constrained random walks for query expansion, it is contemplated that the path-constrained random walk-based technique set forth herein can alternatively be utilized for query-document matching (e.g., used for web document ranking directly). For example, a relevance score of a query Q and a document D can be modeled as a probability, computed by a learned combination of path-constrained random walks from Q to D, where different document ranking models can be incorporated as path types. Following this example, in addition to clickthrough data, other data sources can be incorporated to construct G, such as link graphs and the category structure of web documents.

Figure 9:
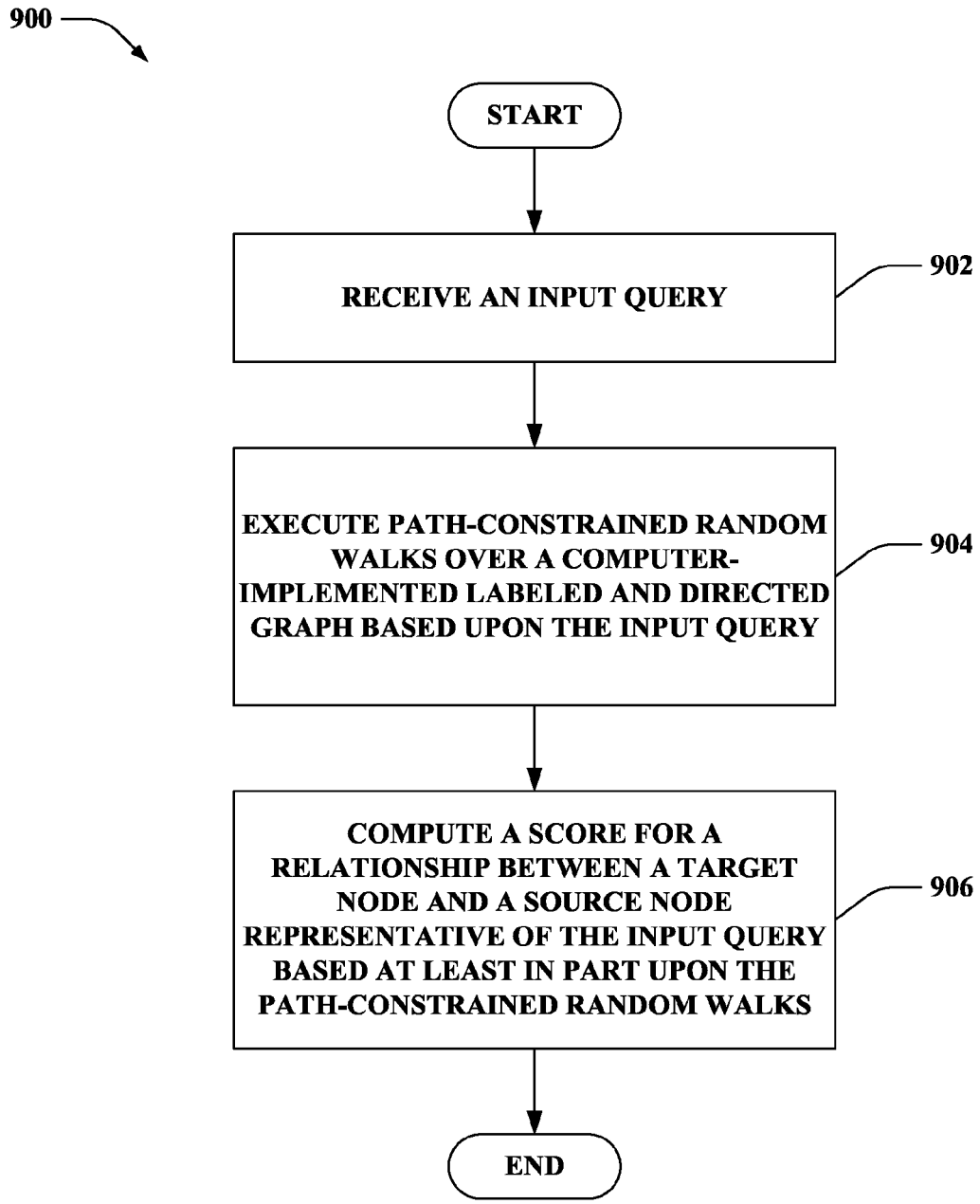
FIG. 9 is a flow diagram that illustrates an exemplary methodology for using path-constrained random walks.
Figure 10:
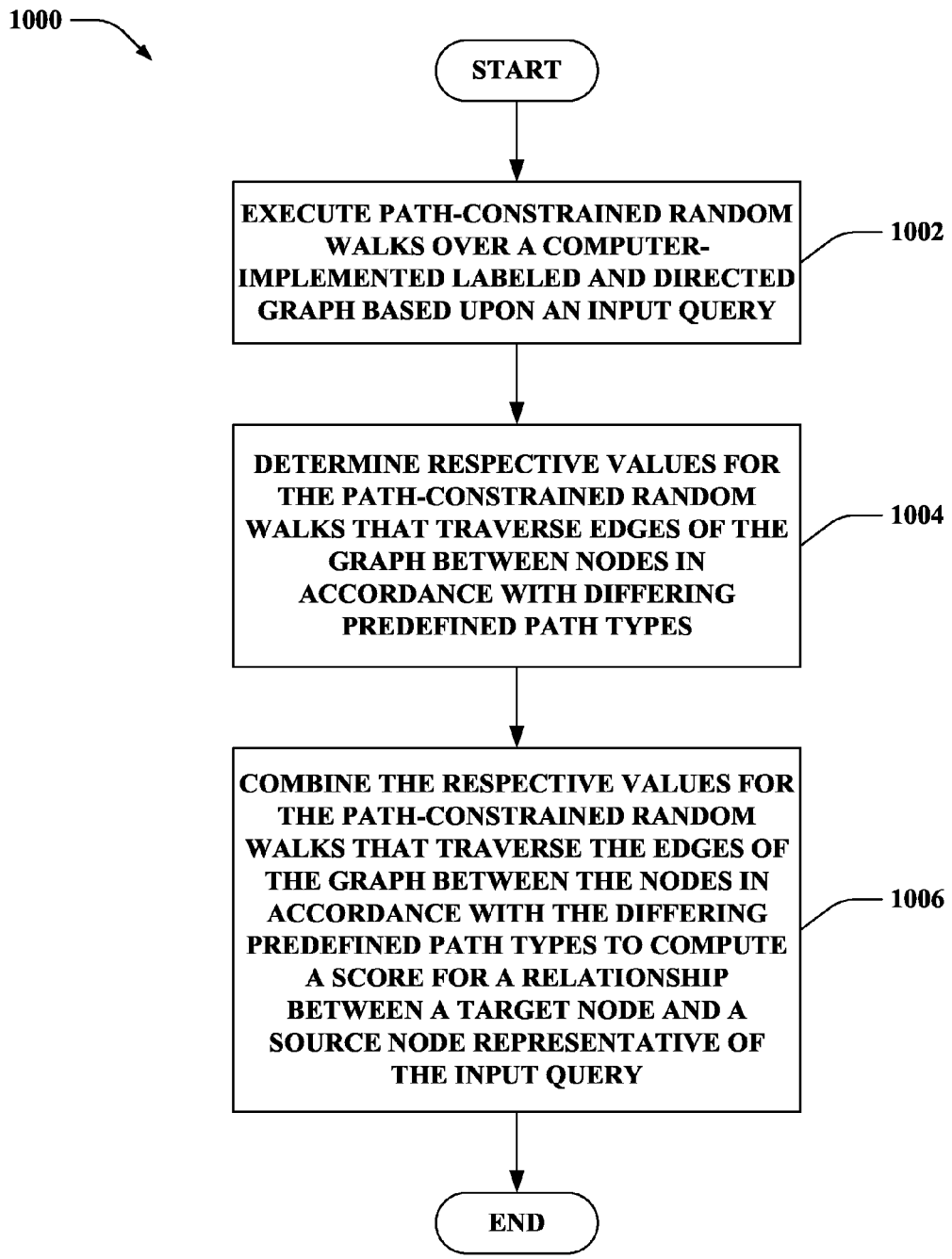
FIG. 10 is a flow diagram that illustrates an exemplary methodology for performing query expansion or query-document matching using path-constrained random walks.

FIGS. 9-10 illustrate exemplary methodologies relating to use of path-constrained random walks. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 9 illustrates a methodology 900 for using path-constrained random walks. At 902, an input query can be received. At 904, path-constrained random walks can be executed over a computer-implemented labeled and directed graph based upon the input query. At 906, a score for a relationship between a target node and a source node representative of the input query can be computed based at least in part upon the path-constrained random walks.

Now turning to FIG. 10, illustrated is a methodology 1000 for performing query expansion or query-document matching using path-constrained random walks. At 1002, path-constrained random walks can be executed over a computer-implemented labeled and directed graph based upon an input query. At 1004, respective values for the path-constrained random walks that traverse edges of the graph between nodes in accordance with differing predefined path types can be determined. At 1006, the respective values for the path-constrained random walks that traverse the edges of the graph between the nodes in accordance with the differing predefined path types can be combined to compute a score for a relationship between a target node and a source node representative of the input query.

Figure 11:
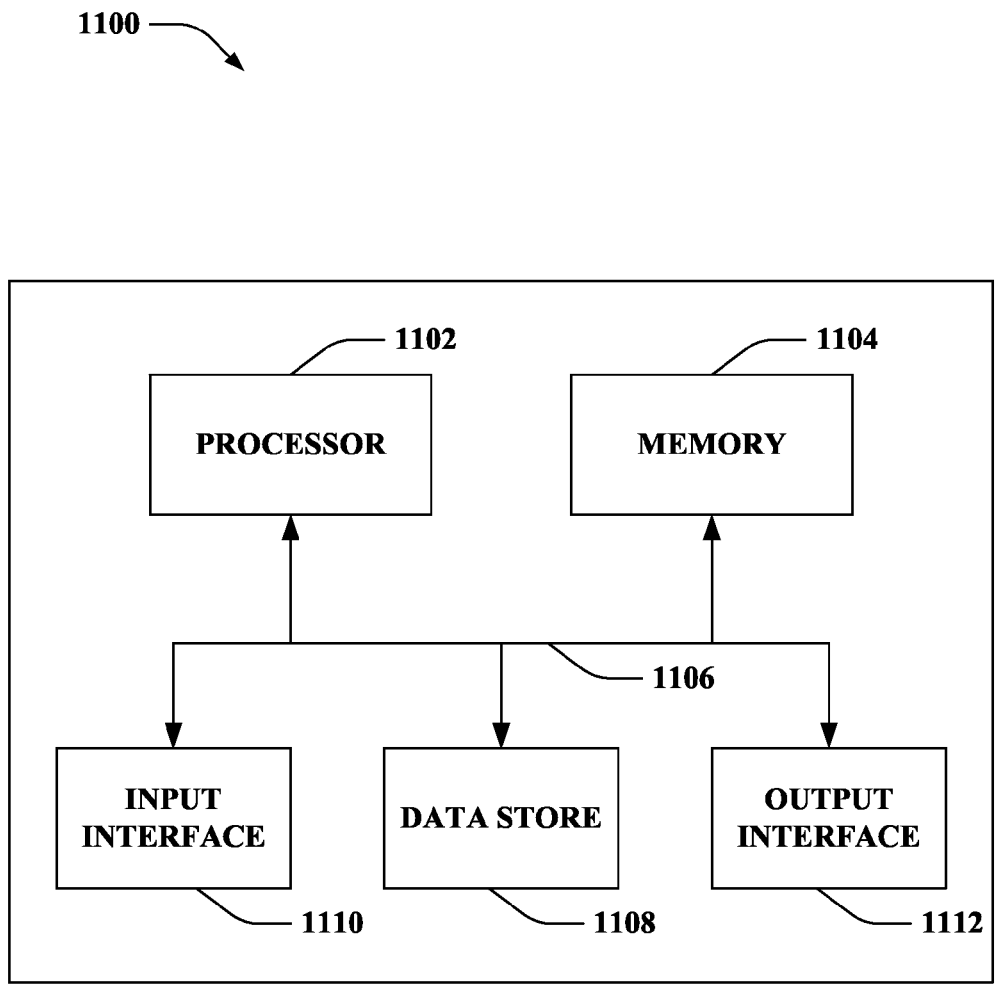
FIG. 11 illustrates an exemplary computing device.

Referring now to FIG. 11, a high-level illustration of an exemplary computing device 1100 that can be used in accordance with the systems and methodologies disclosed herein is illustrated. For instance, the computing device 1100 may be used in a system that executes path-constrained random walks for query expansion and/or query document matching. By way of another example, the computing device 1100 may be used in a system that constructs labeled and directed graph based upon clickthrough data from search logs. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store a labeled and directed graph, scores for relationships, ranked lists, clickthrough data, and so forth.

The computing device 1100 additionally includes a data store 1108 that is accessible by the processor 1102 by way of the system bus 1106. The data store 1108 may include executable instructions, a labeled and directed graph, scores for relationships, ranked lists, clickthrough data, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method comprising the following computer-executable acts:
   receiving an input query;
   executing path-constrained random walks over a computer-implemented labeled and directed graph based upon the input query, wherein the labeled and directed graph comprises:
      a first set of nodes that are representative of queries comprised in clickthrough data from search logs;
      a second set of nodes that are representative of documents comprised in the clickthrough data from the search logs;
      a third set of nodes that are representative of words from the queries and the documents; and
      edges between nodes that are representative of relationships between the queries, the documents, and the words;
      wherein the path-constrained random walks comprise traversals over edges of the graph between nodes, the path-constrained random walks traverse the edges of the graph between the nodes in accordance with predefined path types, an each of the predefined path types comprises a respective sequence of relations between the nodes in the graph for traversing as part of a corresponding path-constrained random walk from the path-constrained random walks; and
   computing a score for a relationship between a target node and a source node representative of the input query based at least in part upon the path-constrained random walks.

2. The method of claim 1, wherein the third set of nodes comprises the target node, and wherein the target node is representative of a candidate query expansion term.

3. The method of claim 2, wherein the input query is desirably input to a search engine, and wherein the method further comprises:
   selecting the candidate query expansion term based at least in part upon the score for the relationship between the target node representative of the candidate query expansion term and the source node representative of the input query; and
   responsive to selecting the candidate query expansion term, causing the search engine to execute a search over a plurality of documents based at least in part upon the candidate query expansion term.

4. The method of claim 2, wherein the input query is desirably input to a search engine, and wherein the method further comprises:
   selecting the candidate query expansion term based at least in part upon the score for the relationship between the target node representative of the candidate query expansion term and the source node representative of the input query; and
   responsive to selecting the candidate query expansion term, causing the search engine to display the candidate query expansion term as a suggested query.

5. The method of claim 1, further comprising outputting a ranked list of candidate query expansion terms based upon respective scores for corresponding relationships between target nodes representative of the candidate query expansion terms and the source node representative of the input query.

6. The method of claim 1, wherein the second set of nodes comprises the target node, and wherein the target node is representative of a candidate document.

7. The method of claim 6, wherein the input query is desirably input to a search engine, and wherein the method further comprises:
   returning the candidate document responsive to execution of a search over a plurality of documents performed by the search engine, wherein the candidate document is returned by the search engine based at least in part upon the score for the relationship between the target node representative of the candidate document and the source node representative of the input query.

8. The method of claim 1, wherein computing the score for the relationship between the target node and the source node representative of the input query further comprising:
   determining respective values for the path-constrained random walks between the target node and the source node representative of the input query, wherein the path-constrained random walks traverse the edges of the graph between the nodes from the source node representative of the input query to the target node in accordance with the predefined path types; and
   combining the respective values for the path-constrained random walks that traverse the edges of the graph between the nodes from the source node representative of the input query to the target node in accordance with the predefined path types to compute the score for the relationship between the target node and the source node representative of the input query.

9. The method of claim 8, wherein weights are assigned to the predefined path types, and wherein the respective values for the path-constrained random walks that traverse the edges of the graph between the nodes from the source node representative of the input query to the target node in accordance with the predefined path types are combined as a function of the weights.

10. The method of claim 1, wherein the edges in the graph are labeled by respective relations, and wherein the edges in the graph are assigned respective edge scores based upon relation-specific probabilistic models for the respective relations.

11. The method of claim 10, wherein an edge score between a particular source node and a particular target node is a probability of reaching the particular target node from the particular source node with a one-step random walk, the probability being based on a type of relation between the particular target node and the particular source node.

12. The method of claim 1, further comprising constructing the labeled and directed graph based upon the clickthrough data from the search logs.

13. A computing apparatus, comprising:
   at least one processor; and
   memory that comprises computer excutable instructions that, when executed by the at least one processor, cause the at least one processor to perform acts including:
      executing path-constrained random walks over a labeled and directed graph based upon an input query, wherein the labeled and directed graph comprises:
         a first set of nodes that represent queries comprised in clickthrough data from search logs;
         a second set of nodes that represent documents comprised in the clickthrough data from the search logs;
         a third set of nodes that represent words from the queries and the documents; and
         edges between nodes that represent relationships between the queries, the documents, and the words;
         wherein the path-constrained random walks traverse edges of the graph between nodes in accordance with predefined path types, and each of the predefined path comprises a respective sequence of relations between the nodes in the graph for traversing as part of a corresponding path-constrained random walk from the path-constrained random walks; and
      computing a score for a relationship between a target node that represents a candidate query expansion term and a source node that represents the input query based at least in part upon the path-constrained random walks.

14. The computing apparatus of claim 13, the memory further comprising computer-executable instructions that, when executed by the at least one processor, cause the at least one processor to perform acts including:
   outputting a ranked list of candidate query expansion terms based upon respective scores for relationships between target nodes that represent the candidate query expansion terms and the source node that represents the input query.

15. The computing apparatus of claim 13, wherein the path-constrained random walks respectively instantiate the predefined path types, and the memory further comprising computer-executable instructions that, when executed by the at least one processor, cause the at least one processor to perform acts including:
   determining respective values for the path-constrained random walks that instantiate the path types; and
   combining the respective values for the path-constrained walks that instantiate the predefined path types to compute the score for the relationship between the target node that represents the candidate query expansion term and the source node that represents the input query.

16. The computing apparatus of claim 13, wherein the edges in the graph are labeled by respective relations, and wherein the edges in the graph are assigned respective edge scores based upon relation-specific probabilistic models for the respective relations.

17. The computing apparatus of claim 16, wherein an edge score between a particular source node and a particular target node is a probability of reaching the particular target node from the particular source node with a one-step random walk, the probability being based on a type of relation between the particular target node and the particular source node.

18. A computer-readable storage medium including computer-executable instructions that, when executed by a processor, cause the processor to perform acts including:
- receiving an input query;
- executing path-constrained random walks over a computer-implemented labeled and directed graph based upon the input query, wherein the labeled and directed graph comprises:
  - a first set of nodes that are representative of queries comprised in clickthrough data from search logs;
  - a second set of nodes that are representative of documents comprised in the clickthrough data from the search logs;
  - a third set of nodes that are representative of words from the queries and the documents; and
  - edges between nodes that are representative of relationships between the queries, the documents, and the words;
  - wherein the path-constrained random walks begin at a source node representative of the input query, traverse edges of the graph between nodes in accordance with differing predefined path types, and end at a target node representative of a candidate document;
- determining respective values for the path-constrained random walks that traverse the edges of the graph between the nodes in accordance with the differing predefined path types; and
- combining the respective values for the path-constrained random walks that traverse the edges of the graph between the nodes in accordance with the differing predefined path types to compute a score for a relationship between the target node representative of the candidate document and the source node representative of the input query.

19. The computer-readable storage medium of claim 18, wherein each of the differing predefined path types comprises a respective sequence of relations between the nodes in the graph for traversing as part of a corresponding path-constrained random walk from the path-constrained random walks.

20. The computer-readable storage medium of claim 18, wherein the edges in the graph are labeled by respective relations, and wherein the edges in the graph are assigned respective edge scores based upon relation-specific probabilistic models for the respective relations.

* * * * *